(No Model.) 2 Sheets—Sheet 1.
D. T. BENNETT.
STOVE HOOD.
No. 585,175. Patented June 29, 1897.
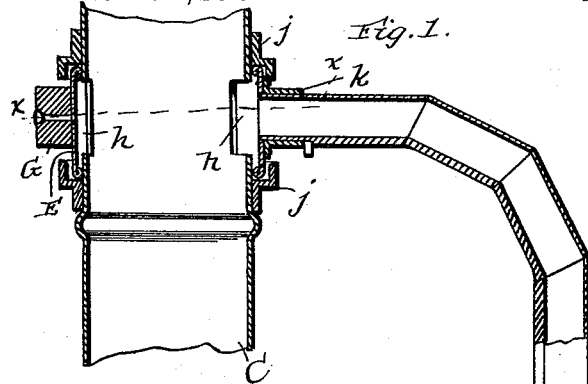
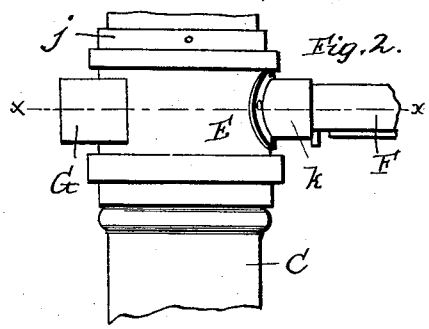
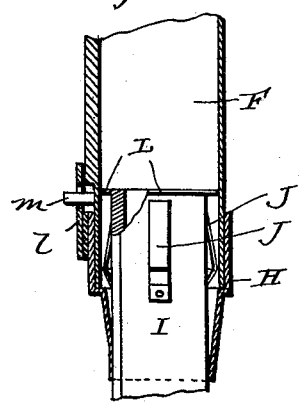
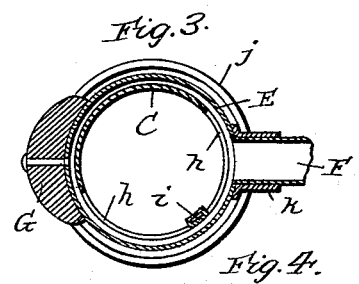
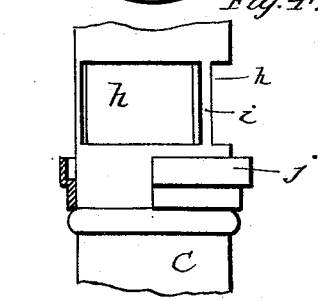
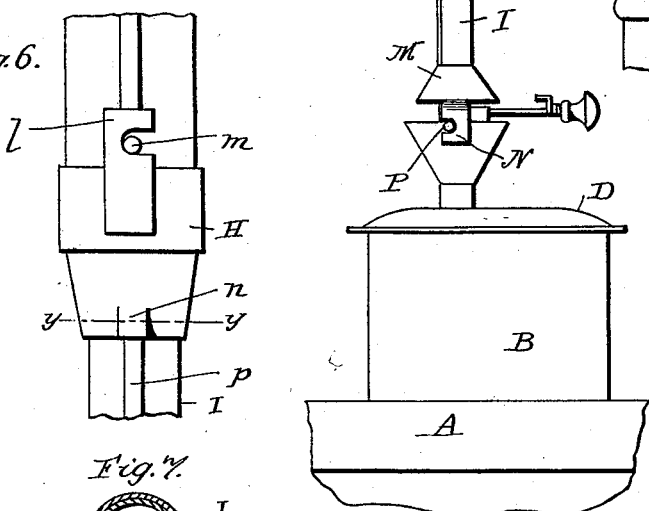
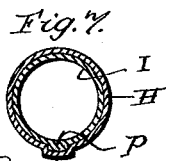
Witnesses:
Inventor
David T. Bennett
By James J. Sheehy
Attorney (No Model.)   2 Sheets—Sheet 2.
D. T. BENNETT.
STOVE HOOD.
No. 585,175.   Patented June 29, 1897.
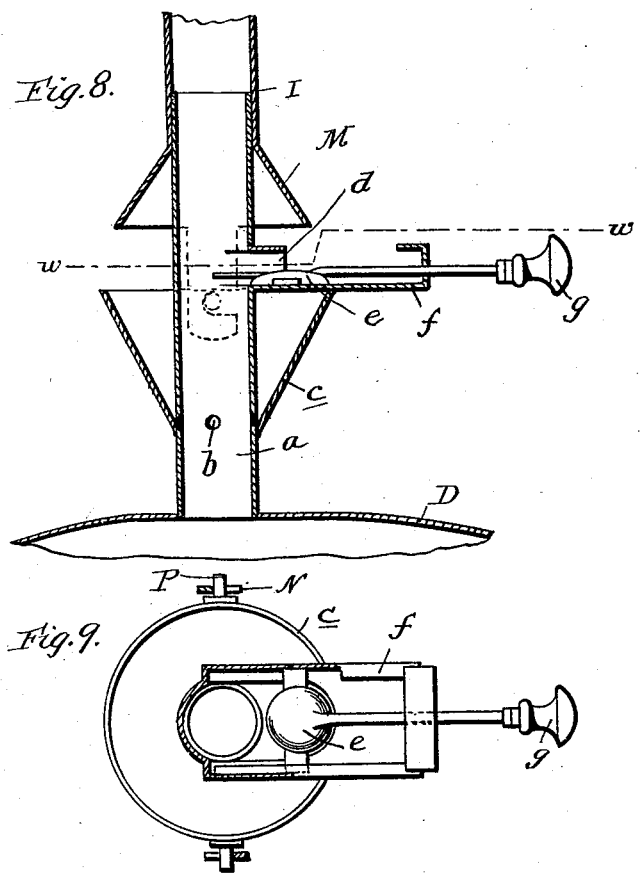
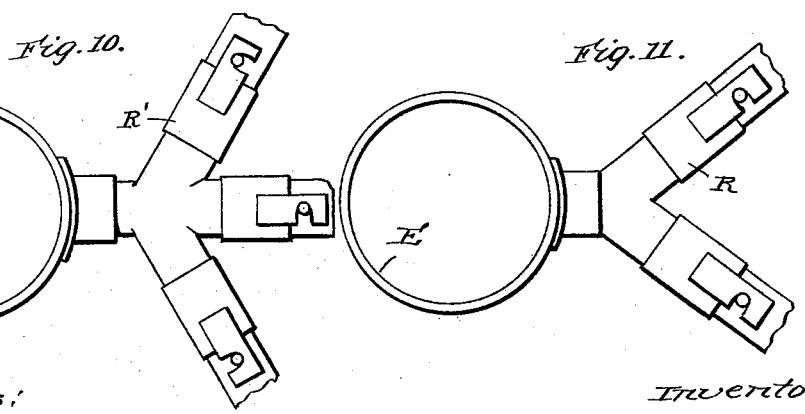
Witnesses:
C. H. Raeder
J. H. Griffin
Inventor
David T. Bennett
By James J. Sheehy
Attorney

UNITED STATES PATENT OFFICE.

DAVID T. BENNETT, OF TRENTON, NEW JERSEY.

STOVE-HOOD.

SPECIFICATION forming part of Letters Patent No. 585,175, dated June 29, 1897.

Application filed April 11, 1896. Serial No. 587,101. (No model.)

*To all whom it may concern:*

Be it known that I, DAVID T. BENNETT, a citizen of the United States, residing at Trenton, in the county of Mercer and State of New Jersey, have invented certain new and useful Improvements in Stove-Hoods; and I do declare the following to be a full, clear, and exact description of the invention, such as will enable others skilled in the art to which it appertains to make and use the same.

My invention relates to stove-hoods or apparatus for conveying odors from cooking utensils to a chimney or uptake, so as to prevent the dissemination of such odors through the kitchen and other apartments of a house, and its novelty and advantages will be fully understood from the following description and claims when taken in conjunction with the accompanying drawings, in which—

Figure 1 is a view, partly in elevation and partly in section, illustrating a portion of a stove, a cooking utensil thereon, a portion of the smoke-pipe, and the device for conveying the odors from the utensil to the smoke-pipe. Fig. 2 is a detail elevation illustrating a portion of the smoke-pipe and a portion of the device for conveying odors thereto. Fig. 3 is a transverse section taken in the plane indicated by the line $x\ x$ of Fig. 1. Fig. 4 is a detail elevation of a portion of the smoke-pipe with the loose collar removed and the collar-flange which supports the same partly broken away. Fig. 5 is a detail section, partly in elevation, illustrating the connection of the extensible pipe to the main pipe of the device. Fig. 6 is an elevation of the same. Fig. 7 is a transverse section taken in the plane indicated by the line $y\ y$ of Fig. 6. Fig. 8 is an enlarged diametrical section illustrating the extensible pipe of the device connected with a utensil-cover. Fig. 9 is a horizontal section taken in the plane indicated by the line $w\ w$ of Fig. 8. Figs. 10 and 11 are detail plan views illustrating the movable collar removed from the smoke-pipe and forms of couplings for connecting a plurality of odor-conveying pipes to said collar.

Referring by letter to said drawings, and more particularly to Figs. 1 to 8 thereof, A indicates a portion of an ordinary stove.

B indicates an ordinary cooking utensil.

C indicates a smoke-pipe which is connected in the usual manner with the stove and with a chimney or uptake, (not illustrated,) and D indicates the utensil-cover which forms part of my improvements. This cover D, as better shown in Fig. 8, is provided with an upwardly-extending tube $a$, which has one or more apertures $b$ at an intermediate point of its length for a purpose presently described, and surrounding said tube $a$ and connected thereto immediately below the apertures $b$ is a funnel-shaped receptacle $c$. This receptacle $c$ is designed to receive the water of condensation which is formed upon and passes down the pipes F I, and the apertures $b$ are designed to permit such water of condensation to pass back into the utensil B.

Immediately above the top of the receptacle $c$ the tube $a$ is slotted, as indicated by $d$, for the entry of the slide-valve $e$, which is arranged in a suitable guide $f$ on the receptacle $c$ and is provided with a handle $g$, whereby it may be conveniently moved through the slot $d$ to close the pipe $a$, or in the opposite direction to open said pipe and permit the odors arising from the cooking to pass up the tube. This valve $e$ is designed to be closed when the cooking is first started, so as to retain the heat in the cooking utensil. When the cooking is well started, the valve is opened to permit free passage of the odors up the tube A.

The smoke-pipe C is provided at an intermediate point of its length with the openings $h$, which are of the proportional length and width illustrated in Figs. 1, 3, and 4 and are separated by the narrow strip of sheet metal $i$, and above and below said openings said pipe C is provided with the fixedly-connected collar-flanges $j$, which serve to hold the movable collar E, which is interposed between them, as illustrated, and is designed to turn upon the pipe C for a purpose presently described. This collar E is provided with a nipple $k$ for the connection of the pipe F, and at an opposite point it is provided with a weight G, which is designed and adapted to counterbalance the weight of the pipe F, so as to enable the collar E to be freely turned on the smoke-pipe C to carry the pipe F and the devices connected therewith to the desired point above the stove.

H indicates a coupling which is arranged upon the extensible pipe I and is designed to receive the lower end of the pipe F and be connected thereto in any suitable manner, although it is preferably provided with a hook *l* to engage a lug *m* on the pipe F, as shown. This coupling H is designed to connect the extensible pipe I to the pipe F, and it is provided at its lower end with a guide *n* (see Figs. 6 and 7) to receive the rib *p* of said pipe I, so as to enable the pipe to slide freely through it and yet prevent turning of the pipe.

The pipe I, as stated, is designed to slide freely in the coupling H and the pipe F, so that the device may be suited to cooking utensils of various heights, and in order to frictionally hold the said pipe I in the positions to which it is adjusted I have provided it with one or more springs J, which are connected at their lower ends to the pipe I, and are bent, as shown, so as to enable them to exert a pressure against the inside of pipe F, and thereby hold the pipe I in the positions to which it is adjusted. The said springs J will prevent the pipe I from being drawn entirely through the coupling H; but in order to effectually prevent this, as well as to enable the pipe I to move steadily in the pipe F, I prefer to provide said pipe I with a flange L at its upper end, as illustrated. It will be obvious from this that it is necessary to place the coupling H on the pipe I before the formation of the flange L and the connection of the springs J at the upper end, or before the lower end of the said pipe is flared outwardly, as presently described.

The pipe I has its lower end flared outwardly, as indicated by M, and provided at opposite points with hooks N to engage lugs P on the receptacle *c*, so as to connect said receptacle and the cover D to the pipe I; but I desire it understood that said connection may be effected in any other manner suitable to the purposes of my invention.

In using my improvements it is simply necessary for the cook to grasp the pipe I and by turning the collar E on the pipe C to move the device until the cover D rests above the utensil B in which the cooking is to be done. The cover D is then lowered by drawing the pipe I down until it fits tightly over said utensil, when the odors arising from the cooking will pass up through the pipes I and F into the smoke-pipe C, and thence into the chimney or uptake and will thereby be effectually prevented from escaping into the kitchen and being disseminated through the same and the other apartments of the house.

The device, as will be readily observed, is very simple, and it may be easily adjusted to suit pots or utensils of various heights and may also be readily accommodated to utensils or pots situated at various points on a stove-top.

In Fig. 11 I have illustrated a coupling R for connecting two pipes, as F, with the collar C, and in Fig. 10 I have shown a similar device R' for connecting three pipes, as F, with the collar C. With these devices and a plurality of pipes F, having appurtenances, as described, it will be seen that a connection may be effected between a plurality of utensils on a stove-top and the chimney, so as to carry off the odors arising from the cooking in said utensils.

Having described my invention, what I claim, and desire to secure by Letters Patent, is—

1. The combination with a stove and a smoke-pipe connected therewith, a pipe F, connected with the smoke-pipe, the coupling detachably connected to the lower end of said pipe F, and having the groove-guide *n*, at its lower end, and a pipe I, extending through the coupling and into the pipe F, and having the longitudinal rib *p*, arranged in the guide *n*, of the coupling and also having the springs J, connected at their lower ends to the pipe and bent outwardly so as to exert a pressure against the inside of the pipe F; the said pipes F, I, being adapted to convey odors from a utensil on the stove to the smoke-pipe, substantially as specified.

2. The combination with a stove and a smoke-pipe connected therewith and having an opening at an intermediate point of its length; of a collar mounted on the pipe and surrounding and adapted to be moved around the same and having a nipple communicating with the opening in the smoke-pipe, a coupling connected to said nipple and having a plurality of branches, pipes connected with said branches and adapted to convey odors from a utensil on the stove to the smoke-pipe, and a weight arranged on the collar at a point opposite to the coupling and adapted to counterbalance the weight of said coupling and the pipes connected thereto, substantially as specified.

3. The combination with a stove and a smoke-pipe connected therewith and having an opening at an intermediate point of its length; of a collar mounted on the pipe and surrounding and adapted to be moved around the same, a pipe connected to the collar and communicating with the opening in the smoke-pipe and adapted to convey odors from a utensil on the stove to the smoke-pipe, and a weight arranged on the collar opposite to the pipe and adapted to counterbalance the weight of said pipe, substantially as and for the purpose set forth.

4. The combination with a stove and a smoke-pipe connected therewith, a pipe connected with the smoke-pipe, a coupling connected to the lower end of said pipe and having a guide, and a second pipe extending through the coupling and into the first-named pipe and having a rib arranged in the guide of the coupling and also having springs exerting pressure against the inside of the first-named pipe; the said pipes being adapted to convey odors from a utensil on the stove to the smoke-pipe, substantially as and for the purpose set forth.

5. The combination with a stove, a utensil placed thereon, a smoke-pipe connected with the stove, a pipe connected and communicating with the smoke-pipe, and the cover for the utensil connected with the second-named pipe and having the tube extending into said pipe and provided with apertures $b$, and also provided with a slot $d$, the receptacle surrounding the tube and connected thereto below the apertures $b$, and the valve arranged in a guide on said receptacle and adapted to be inserted through the slot $d$, and close the tube, substantially as and for the purpose set forth.

In testimony whereof I affix my signature in presence of two witnesses.

DAVID T. BENNETT.

Witnesses:
JOSEPH G. BENNETT,
EDWARD W. LEE.